US010598304B2

(12) United States Patent
Strunk

(10) Patent No.: US 10,598,304 B2
(45) Date of Patent: Mar. 24, 2020

(54) ENERGY-DISSIPATIVE TUBES, ARC-TRAPPING BUSHINGS, AND KITS, SYSTEMS, AND METHODS INCORPORATING THE SAME

(71) Applicant: Titeflex Corporation, Springfield, MA (US)

(72) Inventor: Jordan Strunk, Portland, TN (US)

(73) Assignee: Titeflex Corporation, Springfield, MA (US)

( * ) Notice: Subject to any disclaimer, the term of this patent is extended or adjusted under 35 U.S.C. 154(b) by 94 days.

(21) Appl. No.: 15/875,323

(22) Filed: Jan. 19, 2018

(65) Prior Publication Data

US 2018/0187803 A1 Jul. 5, 2018

Related U.S. Application Data

(63) Continuation of application No. PCT/US2017/067546, filed on Dec. 20, 2017.
(Continued)

(51) Int. Cl.
*F16L 11/00* (2006.01)
*F16L 11/12* (2006.01)
(Continued)

(52) U.S. Cl.
CPC ............. *F16L 11/125* (2013.01); *B32B 1/00* (2013.01); *F16L 11/127* (2013.01); *F16L 11/15* (2013.01); *F16L 25/0036* (2013.01); *F16L 25/01* (2013.01)

(58) Field of Classification Search
CPC .................. F16L 11/125; F16L 11/15
(Continued)

(56) References Cited

U.S. PATENT DOCUMENTS 4,510,974 A * 4/1985 Natori ............... B60H 1/00571
138/124
6,009,912 A * 1/2000 Andre ................... B21C 37/122
138/143
(Continued)

FOREIGN PATENT DOCUMENTS

GB    2424935 A    10/2006

OTHER PUBLICATIONS

All-Foils, Inc., Laminated Foils, "Adhesive Foil Lamination Increases Contaminant Resistance",http://www.allfoils.com/single-product/laminated-foil/, 2 pages, downloaded Nov. 30, 2016.
(Continued)

*Primary Examiner* — James F Hook
(74) *Attorney, Agent, or Firm* — Saul Ewing Arnstein & Lehr LLP; Brian R. Landry

(57) ABSTRACT

One aspect of the invention provides an energy-dissipative fuel gas tube including: a length of corrugated stainless steel tubing; an inner resin layer surrounding a radially outer surface of the corrugated stainless steel tubing; a laminated foil layer surrounding a radially outer surface of the inner resin layer; and an outer resin layer extruded over a radially outer surface of the laminated foil. The laminated foil layer includes: a foil and a high-tensile-strength material bonded to the foil. Another aspect of the invention provides an energy-dissipative fuel gas tube including: a length of corrugated stainless steel tubing; a resin layer surrounding a radially outer surface of the corrugated stainless steel tubing; and a laminated foil layer surrounding and bound directly to a radially outer surface of the resin layer. The laminated foil layer includes: a foil and an outer protective layer bonded to the foil.

18 Claims, 15 Drawing Sheets

Related U.S. Application Data

(60) Provisional application No. 62/441,937, filed on Jan. 3, 2017.

(51) Int. Cl.
*F16L 11/15* (2006.01)
*F16L 25/00* (2006.01)
*B32B 1/00* (2006.01)
*F16L 25/01* (2006.01)
*F16L 11/127* (2006.01)

(58) Field of Classification Search
USPC .............. 138/121, 122, 134, 137, 138, 139
See application file for complete search history.

(56) References Cited

U.S. PATENT DOCUMENTS

| | | | | |
|---|---|---|---|---|
| 6,041,827 | A * | 3/2000 | Takahashi | B05D 7/146 138/139 |
| 6,213,155 | B1 * | 4/2001 | Furuta | F16L 11/02 138/123 |
| 6,293,311 | B1 * | 9/2001 | Bushi | B32B 27/304 138/138 |
| 6,317,541 | B1 | 11/2001 | Davidson | |
| 6,439,268 | B2 * | 8/2002 | Niki | F16L 11/082 138/126 |
| 6,604,551 | B2 | 8/2003 | Nishi et al. | |
| 6,877,781 | B2 | 4/2005 | Edler | |
| 7,044,167 | B2 | 5/2006 | Rivest | |
| 8,905,083 | B2 | 12/2014 | Strunk | |
| 9,249,904 | B2 * | 2/2016 | Duquette | F16L 9/147 |
| 9,445,486 | B2 | 9/2016 | Duquette et al. | |
| 2001/0023714 | A1 * | 9/2001 | Niki | F16L 11/00 138/126 |
| 2004/0040609 | A1 * | 3/2004 | Oishi | B32B 1/08 138/141 |
| 2007/0023097 | A1 * | 2/2007 | Milhas | B29D 23/001 138/113 |
| 2008/0245434 | A1 | 10/2008 | Hibino et al. | |
| 2009/0114304 | A1 | 5/2009 | Mohri et al. | |
| 2012/0152584 | A1 | 6/2012 | Goodson | |
| 2013/0192708 | A1 * | 8/2013 | Strunk | F16L 11/1185 138/121 |
| 2014/0145434 | A1 | 5/2014 | Oh | |
| 2015/0068635 | A1 | 3/2015 | Strunk | |
| 2015/0367563 | A1 * | 12/2015 | Porter | B32B 1/08 138/141 |
| 2016/0105944 | A1 | 4/2016 | Duquette et al. | |
| 2016/0339547 | A1 | 11/2016 | Duquette et al. | |
| 2017/0159858 | A1 * | 6/2017 | Strunk | F16L 11/11 |

OTHER PUBLICATIONS

All-Foils, Inc., Laminated Foils, Technical Datasheet, http://www.allfoils.com/single-product/laminated-foil/, 2 pages, downloaded Nov. 30, 2016.

Plastics Technology, "Now They Want Plastics To Be Heavy?", http://www.ptonline.com/articles/now-they-want-plastics-to-be-heavy, 5 pages, Jun. 2001.

Plastemart.com, "Thermoplastic compound with high specific gravity has niche market", http://www.plastemart.com/upload/literature/high-gravity-compounds-HG . . . , 1 page, downloaded Nov. 18, 2016.

Plastics Technology, "Extrusion Methods", http://www.ptoonline.com/knowledgecenter/Profile-Extrusion/profile-extrusion-fundamenta . . . , 2 pages, downloaded Nov. 9, 2016.

Precision Coatings Inc., "Thermal Spray, Plasma Spray, HVOF, Flame Spray, Metalizing & Thermal Spray Coatin . . . ", http://www.precisioncoatings.com/what-is-thermal-spray.html, 2 pages, downloaded Aug. 12, 2016.

ThomasNet.com, "How to Metalize Plastic", http://www.thomasnet.com/articles/custom-manufacturing-fabricating/how-to-metalize-pla . . . , 2 pages, downloaded Aug. 12, 2016.

Wikipedia, "Hot-melt adhesive", https://en.wikipedia.org/wiki/Hot-melt_adhesive, 10 pages, downloaded Dec. 8, 2017.

Wikipedia, "Metallised film", https://en.m.wikipedia.org/wiki/Metallised_film, 4 pages, downloaded Aug. 12, 2016.

Wikipedia, "Nylon", https://en.wikipedia.org/wiki/Nylon, 7 pages, downloaded Dec. 8, 2017.

Wikipedia, "Physical vapor deposition", https://en.wikipedia.org/wiki/Physical_vapor_deposition, 4 pages, downloaded Aug. 12, 2016.

International Search Report and Written Opinion, International Patent Application No. PCT/US2017/067546, dated Apr. 16, 2018.

* cited by examiner

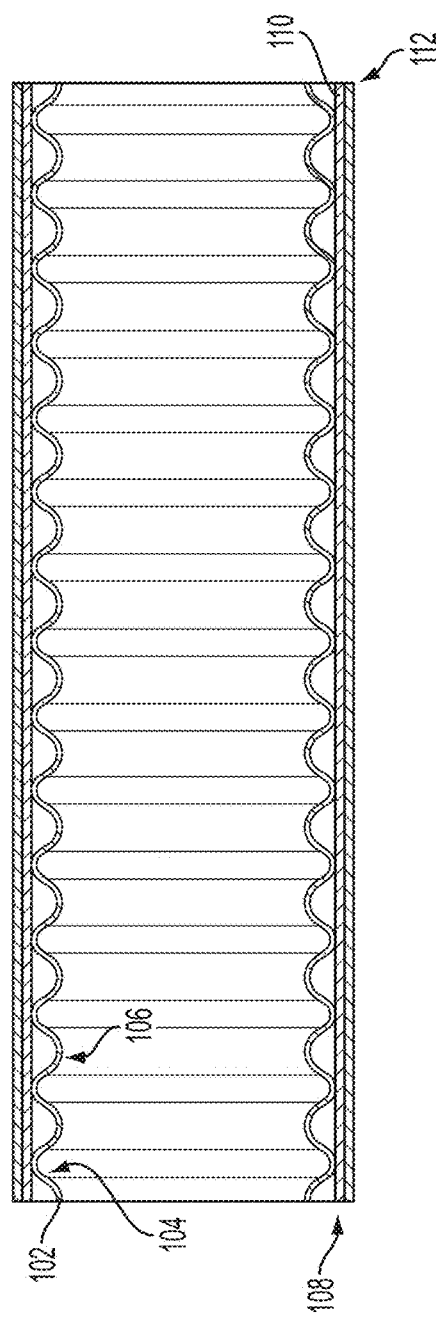
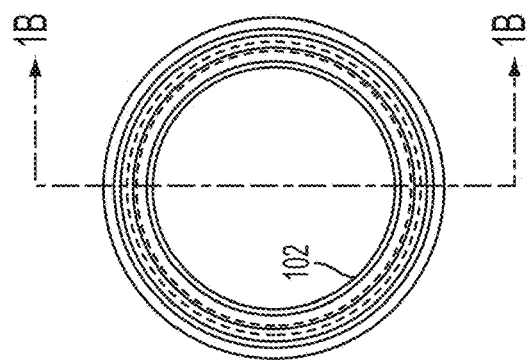
FIG. 1B
FIG. 1A

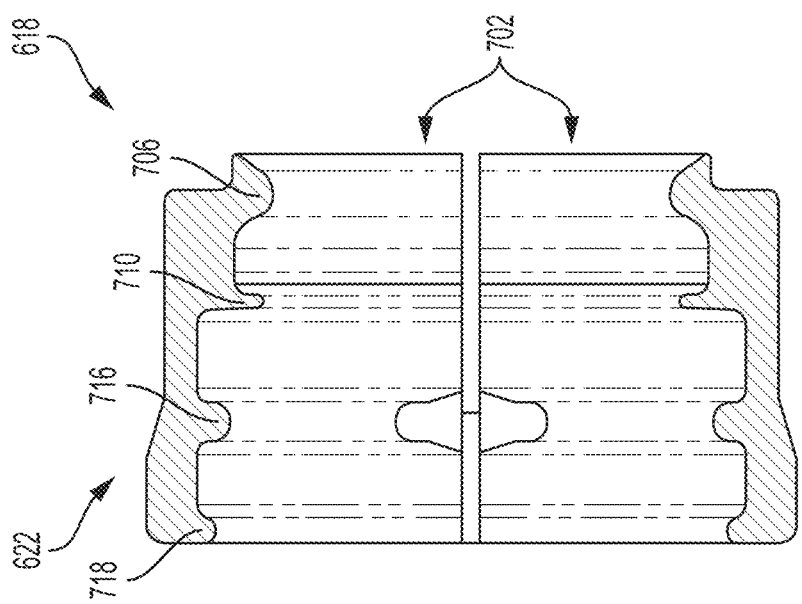
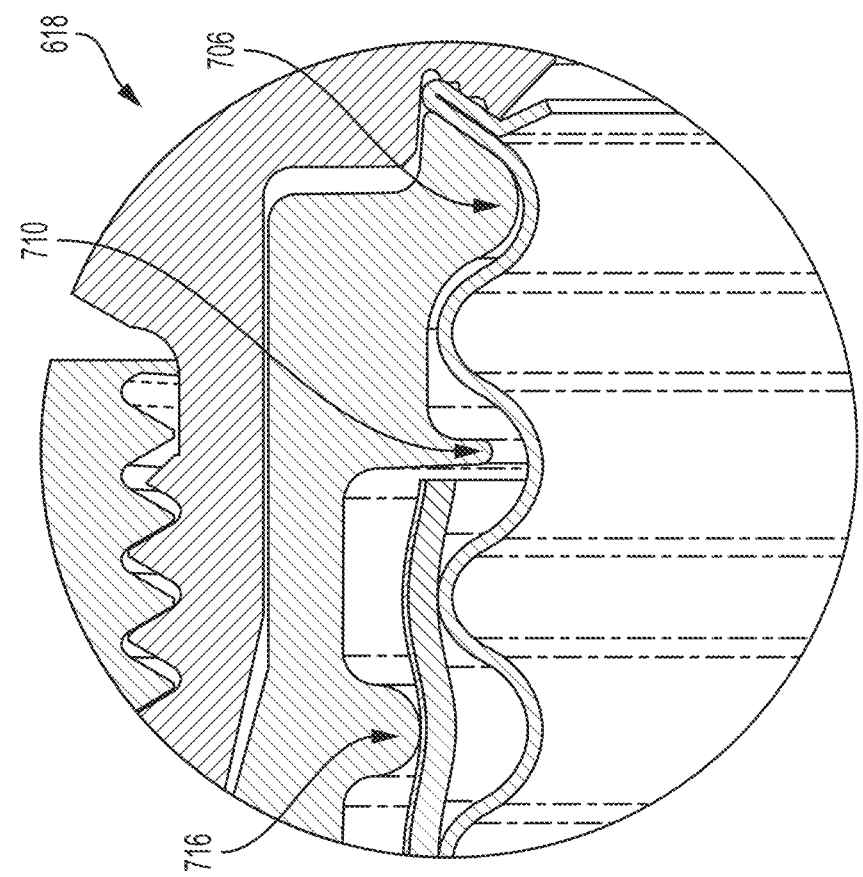

US 10,598,304 B2

ENERGY-DISSIPATIVE TUBES, ARC-TRAPPING BUSHINGS, AND KITS, SYSTEMS, AND METHODS INCORPORATING THE SAME

CROSS-REFERENCE TO RELATED APPLICATION(S)

This application is a continuation under 35 U.S.C. § 120 of International Application No. PCT/US2017/067546, filed Dec. 20, 2017, which claims priority to U.S. Provisional Patent Application Ser. No. 62/441,937, filed Jan. 3, 2017. The entire content of each of these applications is hereby incorporated by reference herein.

BACKGROUND OF THE INVENTION

Gas and liquid piping systems utilizing corrugated stainless steel tubing ("CSST") and fittings can be designed for use in combination with elevated pressures of up to about 25 psi or more and provide advantages over traditional rigid black iron piping systems in terms of ease and speed of installation, elimination of onsite measuring, and reduction in the need for certain fittings such as elbows, tees, and couplings.

SUMMARY OF THE INVENTION

One aspect of the invention provides an energy-dissipative fuel gas tube including: a length of corrugated stainless steel tubing; an inner resin layer surrounding a radially outer surface of the corrugated stainless steel tubing; a laminated foil layer surrounding a radially outer surface of the inner resin layer; and an outer resin layer extruded over a radially outer surface of the laminated foil. The laminated foil layer includes: a foil and a high-tensile-strength material bonded to the foil.

This aspect of the invention can have a variety of embodiments. The high-tensile-strength material can have a pre-lamination ultimate tensile strength of at least about 3 lb-f/inch of width. The high-tensile-strength material can have a pre-lamination ultimate tensile strength of between about 5 lb-f/inch of width and about 80 lb-f/inch of width. The foil can have a pre-lamination ultimate tensile strength of less than about 12 lb-f/inch of width.

The laminated foil layer can have an ultimate tensile strength of at least about 8 lb-f/inch of width. The laminated foil layer can have an ultimate tensile strength of between about 8 lb-f/inch of width and about 140 lb-f/inch of width.

The high-tensile-strength material can be a polymer. The high-tensile-strength material cam be a polyester. The high-tensile-strength material can be polyethylene terephthalate (PET).

The outer resin layer can provide a minimum dielectric strength of 110 volts to one or more underlying layers selected from the group consisting of: the foil, the inner resin layer, and the corrugated stainless steel tubing. The outer resin layer can completely surround the laminated foil layer. The outer resin layer can include a non-conductive polymer. The outer resin layer can include nylon.

The laminated foil layer can be bound to the inner resin layer by a hot-melt adhesive. The hot-melt adhesive can be ethylene acrylic acid.

Another aspect of the invention provides an energy-dissipative fuel gas tube including: a length of corrugated stainless steel tubing; a resin layer surrounding a radially outer surface of the corrugated stainless steel tubing; and a laminated foil layer surrounding and bound directly to a radially outer surface of the resin layer. The laminated foil layer includes: a foil and an outer protective layer bonded to the foil.

This aspect of the invention can have a variety of embodiments. The outer protective layer can be a high-tensile-strength material.

The resin layer can be bound to the laminated foil layer with a conductive adhesive. The resin layer can be bound to the laminated foil layer with a hot-melt adhesive. The resin layer can be bound to the laminated foil layer with an ethylene acrylic acid adhesive.

The outer protective layer can include one or more materials selected from the group consisting of: polyethylene terephthalate, polyester, polyamide, polyethylene, and polypropylene. The outer protective layer can include polyethylene terephthalate. The outer protective layer can provide a minimum dielectric strength of 110 volts to one or more underlying layers selected from the group consisting of: the foil, the inner resin layer, and the corrugated stainless steel tubing.

The energy-dissipative fuel gas tube can further include an outer resin layer extruded over a radially outer surface the laminated foil. The outer resin layer can include a non-conductive polymer. The outer resin layer can include nylon. The outer resin layer can provide a minimum dielectric strength of 110 volts to one or more underlying layers selected from the group consisting of: the foil layer, the inner resin layer, and the corrugated stainless steel tubing.

Another aspect of the invention provides a kit including: a length of energy-dissipative tubing; a sealing device including a bushing; and instructions. The length of energy-dissipative tubing includes: a length of corrugated stainless steel tubing; a resin layer surrounding the outside of the corrugated stainless steel tubing; and a conductive layer adjacent to an outer surface of the resin layer. The bushing includes: a first internal rib adapted and configured to engage a final corrugation valley of the corrugated tubing; and a second internal rib adapted and configured to rest within a further uncovered corrugation valley of the corrugated tubing and lie substantially between the conductive layer of the energy-dissipative tubing and a proximal corrugation peak upon placement over an end of energy-dissipative tubing. The instructions direct a user to: remove the resin layer, the conductive layer, and the outer protective layer to create the further uncovered corrugation valley; place the bushing over the final corrugation valley and the further uncovered corrugation valley; and seal the bushing and the end of the energy-dissipative tubing within the sealing device.

This aspect of the invention can have a variety of embodiments. The second internal rib can be substantially perpendicular to a central axis of the bushing. The second internal rib may not be in direct contact with the further uncovered corrugation valley, the conductive layer, or the resin layer.

The kit can further include a jacket-stripping tool including one or more cutting blades arranged substantially perpendicular to a central axis of the tool and adapted and configured to create one or more cuts through the resin layer, the conductive layer, and the protective layer of the energy-dissipative tubing over the further uncovered corrugation valley.

The conductive layer can include a laminated foil.

Another aspect of the invention provides a system including: a length of energy-dissipative tubing and a sealing device including a bushing. The length of energy-dissipative tubing includes: a length of corrugated stainless steel tubing;

a resin layer surrounding the outside of the corrugated stainless steel tubing; and a conductive layer adjacent to an outer surface of the resin layer. The bushing includes: a first internal rib engaged with a final corrugation valley of the corrugated tubing; and a second internal rib resting within a further uncovered corrugation valley of the corrugated tubing and lying substantially between the conductive layer of the energy-dissipative tubing and a proximal corrugation peak of the energy-dissipative tubing.

Another aspect of the invention provides a method of installing energy-dissipative tubing having a length of corrugated stainless steel tubing, a resin layer surrounding the outside of the corrugated stainless steel tubing, and a conductive layer adjacent to an outer surface of the resin layer. The method includes: removing the resin layer, the conductive layer, and the outer protective layer from an end of the energy-dissipative tubing to expose two or more corrugation valleys including both a final corrugation valley and a further uncovered corrugation valley; applying a bushing to the end of the energy-dissipative tubing; sealing the bushing and the end of the energy-dissipative tubing within a sealing device. The bushing includes: a first internal rib engaged with a final corrugation valley of the corrugated tubing; and a second internal rib, resting within a further uncovered corrugation valley of the corrugated tubing and lying substantially between the conductive layer of the energy-dissipative tubing and a proximal corrugation peak of the energy-dissipative tubing.

Another aspect of the invention provides a system including: a length of energy-dissipative tubing; a first sealing device coupled to a first end of the length of energy-dissipative tubing; and a second sealing device coupled to a second end of the length of energy-dissipative tubing. Exposure to one or more selected from the group consisting of: fault currents or lightning strikes at an exposure point along the length of energy-dissipative tubing will produce arcs at the exposure point and at least one of the first end and the second end.

This aspect of the invention can have a variety of embodiments. Exposure to one or more selected from the group consisting of: fault currents or lightning strikes at an exposure point along the length of energy-dissipative tubing can produce arcs at the exposure point and both of the first end and the second end.

Another aspect of the invention provides an energy-dissipative fuel gas tube including: a length of corrugated stainless steel tubing; a first resin layer surrounding the outside of the corrugated stainless steel tubing; and a second resin layer directly in contact with the outside of the first resin layer. The second resin layer includes conductive metal particles.

This aspect of the invention can have a variety of embodiments. The first resin layer and second resin layer can be co-extruded without additional materials or layers between the first resin layer and the second resin layer.

The first resin layer can have a volume resistivity of about $10^2$ to about $10^6$ $\Omega$-cm.

The second resin layer can have a surface resistivity less than about $10^3$ $\Omega$/square.

The second resin layer can include stainless steel particles. The stainless steel particles can be selected from the group consisting of stainless steel fiber and stainless steel powder.

A volume:volume ratio of conductive particles to resin in the second resin layer can be between about 0.3% and 50%.

The second resin layer can have a specific gravity of about 1.0 to about 6.0 relative to water.

The second resin layer can include about 0.8 g to about 4.0 g of conductive metal particles per linear foot of tubing.

The second resin layer can have a cross-sectional thickness of about 0.002 inches to about 0.03 inches.

The first resin layer and second resin layer can each independently include one or more materials selected from the group consisting of: a polymer, a thermoplastic polymer, and a thermoset polymer. The first resin layer and second resin layer can each independently include one or more materials selected from the group consisting of: polytetrafluoroethylene (PTFE), polyolefin compounds, polyethylene, crosslinked polyethylene, UV-resistant polyethylene, ethylene-propylene rubber, silicone rubber, polyvinyl chloride (PVC), ethylene tetrafluoroethylene (ETFE), and ethylene propylene diene monomer (EPDM) rubber. The first resin layer and second resin layer can each include polyethylene.

The first resin layer can have a cross-sectional thickness of about 0.01 inches to about 0.05 inches.

A ratio of volume resistivity of the first resin layer (measured in $\Omega$-cm) to surface resistivity of the second resin layer (measured in $\Omega$/square) can be selected from the group consisting of: greater than about 0.1:1, greater than about 1:1, greater than about 10:1, greater than about 100:1, and greater than about 1,000:1. A ratio of volume resistivity of the first resin layer (measured in $\Omega$-cm) to surface resistivity of the second resin layer (measured in $\Omega$/square) can be selected from the group consisting of: between about 0.1:1 and about 1:1, between about 1:1 and about 10:1, between about 10:1 and about 100:1, between about 100:1 and about 1,000:1, and the like.

BRIEF DESCRIPTION OF THE DRAWINGS

For a fuller understanding of the nature and desired objects of the present invention, reference is made to the following detailed description taken in conjunction with the accompanying drawing figures wherein like reference characters denote corresponding parts throughout the several views and wherein:

FIGS. 1A and 1B depict a multi-layer jacketed tube according to an embodiment of the invention.

FIGS. 3A and 3B depict a coextruded first jacket layer and second jacket layer according to an embodiment of the invention. FIG. 3C depicts a first jacket layer coated with a sprayed-on second jacket layer according to an embodiment of the invention.

FIGS. 7A-7G depict an arc-trapping bushing according to an embodiment of the invention.

DEFINITIONS

Figure 2B:
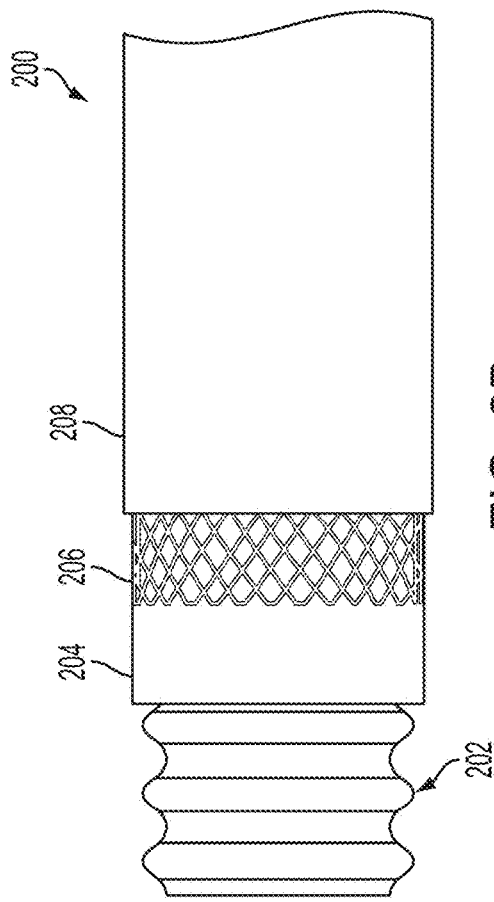
FIGS. 2A-2D depict an energy-dissipative tube.
Figure 2D:
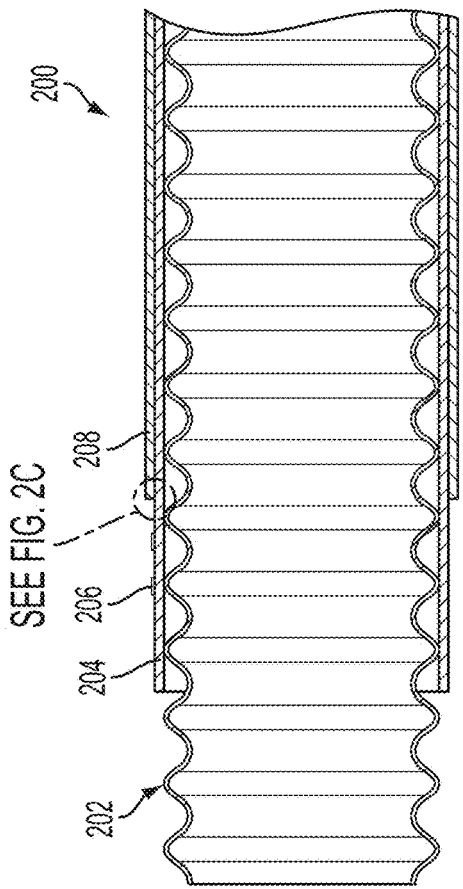
Figure 2A:
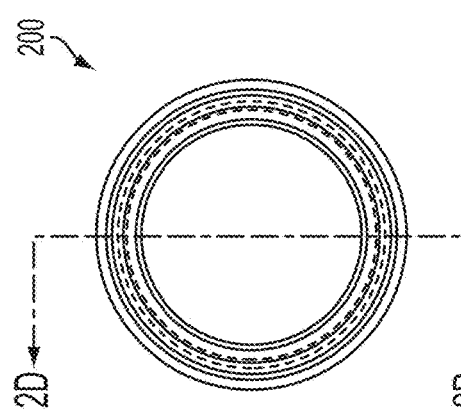
Figure 2C:
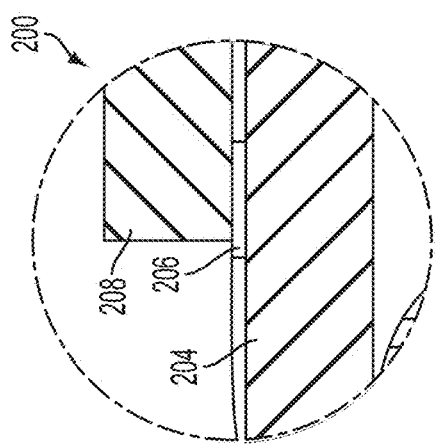

The instant invention is most clearly understood with reference to the following definitions:

As used herein, the singular form "a," "an," and "the" include plural references unless the context clearly dictates otherwise.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from context, all numerical values provided herein are modified by the term about.

As used herein, the term "alloy" refers to a homogenous mixture or metallic solid solution composed of two or more elements. Examples of alloys include austenitic nickel-chromium-based super-alloys (available, e.g., under the INCONEL® trademark from Huntington Alloys Corporation of Huntington, W. Va.), brass, bronze, steel, low carbon steel, phosphor bronze, stainless steel, and the like.

As used in the specification and claims, the terms "comprises," "comprising," "containing," "having," and the like can have the meaning ascribed to them in U.S. patent law and can mean "includes," "including," and the like.

As used herein, the terms "corrugated stainless steel tubing" and "CSST" refer to any type of semi-flexible tubing or piping that can accommodate corrosive or aggressive gases or liquids. In some embodiments, CSST is designed and/or approved for conveyance of fuel gases such as natural gas, methane, propane, and the like. For example, CSST can comply with a standard such as the ANSI LC 1-2005/CSA 6.26-2005 Standard for Fuel Gas Piping Systems Using Corrugated Stainless Steel Tubing. The inventions described herein can be utilized in conjunction with all commercially available CSST products including, but not limited to CSST sold under the GASTITE® and FLASHSHIELD® brands by Titeflex Corporation of Portland, Tenn.; TRACPIPE® and COUNTERSTRIKE® brands by OmegaFlex, Inc. of Exton, Pa.; WARDFLEX® brand by Ward Manufacturing of Blossburg, Pa.; PRO-FLEX® by Tru-Flex Metal Hose Corp. of Hillsboro, Ind.; and DIAMONDBACK™ brand by Metal Fab, Inc. of Wichita, Kans.

Unless specifically stated or obvious from context, the term "or," as used herein, is understood to be inclusive.

As used herein, the term "metal" refers to any chemical element that is a good conductor of electricity and/or heat, and alloys thereof. Examples of metals include, but are not limited to, aluminum, cadmium, niobium (also known as "columbium"), copper, gold, iron, nickel, platinum, silver, tantalum, tin, titanium, zinc, zirconium, and the like.

As used herein, the term "resin" refers to any synthetic or naturally occurring polymer.

Ranges provided herein are understood to be shorthand for all of the values within the range. For example, a range of 1 to 50 is understood to include any number, combination of numbers, or sub-range from the group consisting 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50 (as well as fractions thereof unless the context clearly dictates otherwise).

DETAILED DESCRIPTION OF THE INVENTION

Corrugated Tubing

Referring to FIGS. 1A and 1B, a length of tubing 100 is provided. The tubing 100 can include corrugated tubing 102 (e.g., corrugated stainless steel tubing) and a jacket 108. The corrugated tubing 102 contains a number of corrugation peaks 104 and corrugation valleys 106, which have a substantially uniform geometry and spacing. For example, the distance between adjacent corrugation valleys 106 (as measured from the inflection point in each valley) will be substantially uniform within particular type of tubing 102.

A jacket 108 (e.g., a multi-layer jacket) covers the outside of the tubing 102. The jacket 108 can include a plurality of layers 110, 112. The layers 110, 112 generally form an annulus around the tubing 102, but may have a circular or non-circular cross-section.

Energy-Dissipative Tubing

Referring now to FIGS. 2A-2D, in order to better mitigate damage from electrical arcing from fault currents and lightning strikes, energy-dissipative jackets are provided that dissipate electrical and thermal energy throughout the respective jackets, thereby protecting the tubing 202. The term "dissipate" encompasses distributing electrical energy to an appropriate grounding device such as a fitting.

Energy-dissipative tubing is described briefly below and is further described in U.S. Patent Application Publication Nos. 2011/0041944 and 2013/0192708.

Preferred embodiments of energy-dissipative jackets preferably include one or more conductive layers for distributing electricity and heat. The conductive layers can include, for example, conductive resins and/or metals as discussed herein.

One embodiment of energy-dissipative tubing 200 is depicted in FIGS. 2A-2D. The energy-dissipative tubing 200 includes a length of tubing 202. The tubing 202 can be metal tubing, thin-walled metal tubing, corrugated tubing, corrugated stainless steel tubing, or the like.

Tubing 202 can be surrounded by a first resin layer 204, a metal layer 206, and a second resin layer 208. Resin layers 204, 208 can be formed from insulative and/or conductive resins.

Insulating resin layers can be formed from a variety of materials. In some embodiments, an insulating elastic layer includes polytetrafluoroethylene (PTFE). Other suitable insulators include polyolefin compounds, thermoplastic polymers, thermoset polymers, polymer compounds, polyethylene, crosslinked polyethylene, UV-resistant polyethylene, ethylene-propylene rubber, silicone rubber, polyvinyl chloride (PVC), ethylene tetrafluoroethylene (ETFE), and ethylene propylene diene monomer (EPDM) rubber.

In some embodiments, each resin layer 204, 208 has a thickness of about 0.015" to about 0.035" (e.g., between about 0.3 mm and about 0.9 mm).

Metal layer 206 can include one or more metals (e.g., ductile metals) and alloys thereof. The metal(s) can be formed into foils, perforated foils, tapes, perforated tapes, cables, wires, strands, meshes, braids, and the like.

In some embodiments, the metal layer 206 is an expanded metal foil as further described in U.S. Patent Application Publication No. 2011/0041944. An exemplary embodiment of energy-dissipative tubing 200 with expanded metal foil is depicted in FIGS. 2A-2D.

In some embodiments, the metal layer 206 completely surrounds the first resin layer 204. In such embodiments, the metal may overlap and/or be welded or soldered in some regions. In still other embodiments, the metal layer 206 can be wrapped spirally or helically around the first resin layer 204. In such an embodiment, the metal layer 206 can overlap or substantially surround the first resin layer 204

In some embodiments, the metal layer 206 is a conventional, non-expanded metal foil, such as aluminum or copper foil that can, in some embodiments, completely envelop the inner resin layer 206.

Various thicknesses of the resin layers 204, 208 and the metal layer 206 can be selected to achieve desired resistance to lightning strikes and physical damage while maintaining desired levels of flexibility.

Particle-Containing Resin Layers

Referring again to FIGS. 1A, 1B, 3A and 3B, one embodiment of the invention provides a second (e.g., outer) jacket layer 112 including conductive particles. In one embodiment, the conductive particles are conductive metal particles (e.g., stainless steel particles). Exemplary particles can include fibers (e.g., particles having longer length than width), powders, granules, and the like. Metal-resin blends (a subset of high-gravity compounds) are available from PolyOne Corporation of Avon Lake, Ohio, Ecomass Technologies of Austin, Tex., and RTP Company of Winona, Minn.

The conductive particles can be a metal such as brass, aluminum, stainless steel and the like.

The conductive particles can be adhered directly to the first jacket layer 110 or can be mixed within and applied as a second, conductive-particle-containing resin layer 112. For example, conductive-particle-containing resin 112 can be extruded over first jacket layer 110 or can be co-extruded with first jacket layer 110. Co-extrusion can improve the mechanical performance of the second jacket layer 112 (e.g., its resistance to separation, cracking when bent, and the like). In some embodiments, jacket layers 110, 112 are bound with an adhesive (e.g., a conductive or non-conductive adhesive). If the conductive particles comprising second jacket layer 112 are adhered directly to the first jacket layer 110, they can be adhered through a spraying method (e.g., thermal arc spraying). The conductive particles can be sprayed onto the first jacket layer 110 and optionally adhered to the first jacket layer 110 through the use of an adhesive.

First jacket layer 110 can be a conductive jacket layer. For example, the first jacket layer 110 can include a carbon-black-impregnated resin. In one embodiment, the first jacket layer 110 has a volume resistivity between about $10^2$ Ω-cm and about $10^6$ Ω-cm (e.g., between about $10^2$ Ω-cm and about $10^3$ Ω-cm, between about $10^3$ Ω-cm and about $10^4$ Ω-cm, between about $10^4$ Ω-cm and about $10^5$ Ω-cm, between about $10^5$ Ω-cm and about $10^6$ Ω-cm, and the like).

In some embodiments, the second jacket layer 112 has a surface resistivity less than or equal to about $10^3$ Ω/square, less than or equal to about $10^2$ Ω-cm, and the like. In certain embodiments, the second jacket layer 112 comprises conductive particles and resin wherein the conductive particles are about 0.3% to about 50% of the total volume of the second jacket layer 112, with the remaining volume being the resin. In other embodiments, the ratio of conductive particles to resin can be such that the specific gravity of the second jacket layer 112 material is about 1.0 to about 6.0. Alternatively, the second jacket layer 112 can have a thickness of about 0.003" and 0.030" (e.g., between about 0.07 mm and about 0.8 mm) and comprise about 0.8 g to about 4.0 g of conductive particles per linear foot of tubing.

In one embodiment, the first jacket layer 110 and the second jacket layer 112 can each include one or more materials selected from the group consisting of a polymer, a thermoplastic polymer and a thermoset polymer.

In certain embodiments, the second jacket layer 112 completely covers the first jacket layer 110.

Figure 3A:
FIGS. 3A-3C are photographs of energy-dissipative tubes according to embodiments of the invention.
Figure 3B:

FIG. 3A is a photograph showing a cross-section of a coextruded first jacket layer 110 and second jacket layer 112. Stainless steel fibers are clearly visible. FIG. 3B is a photograph of showing a perspective view of tubing depicted in FIG. 3A.

Figure 3C:

FIG. 3C is a photograph of an outer surface of a second jacket layer 112 wherein the second jacket layer 112 includes metal particles adhered to a first jacket layer 110 through spraying onto an adhesive.

Jackets Having Laminated Foil

Figure 4A:
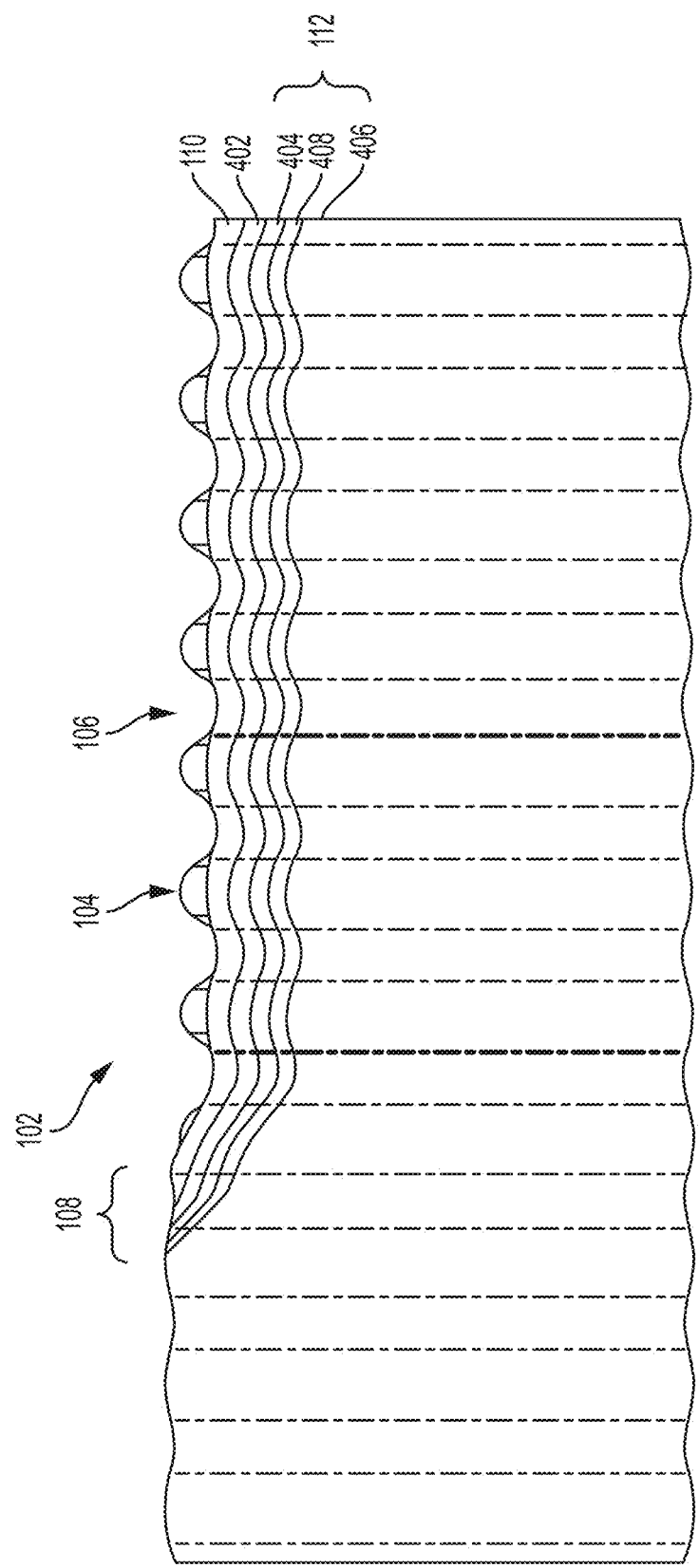
FIGS. 4A and 4B depict partial cutaway views of a multi-layer jacketed tube according to an embodiment of the invention.
Figure 4B:
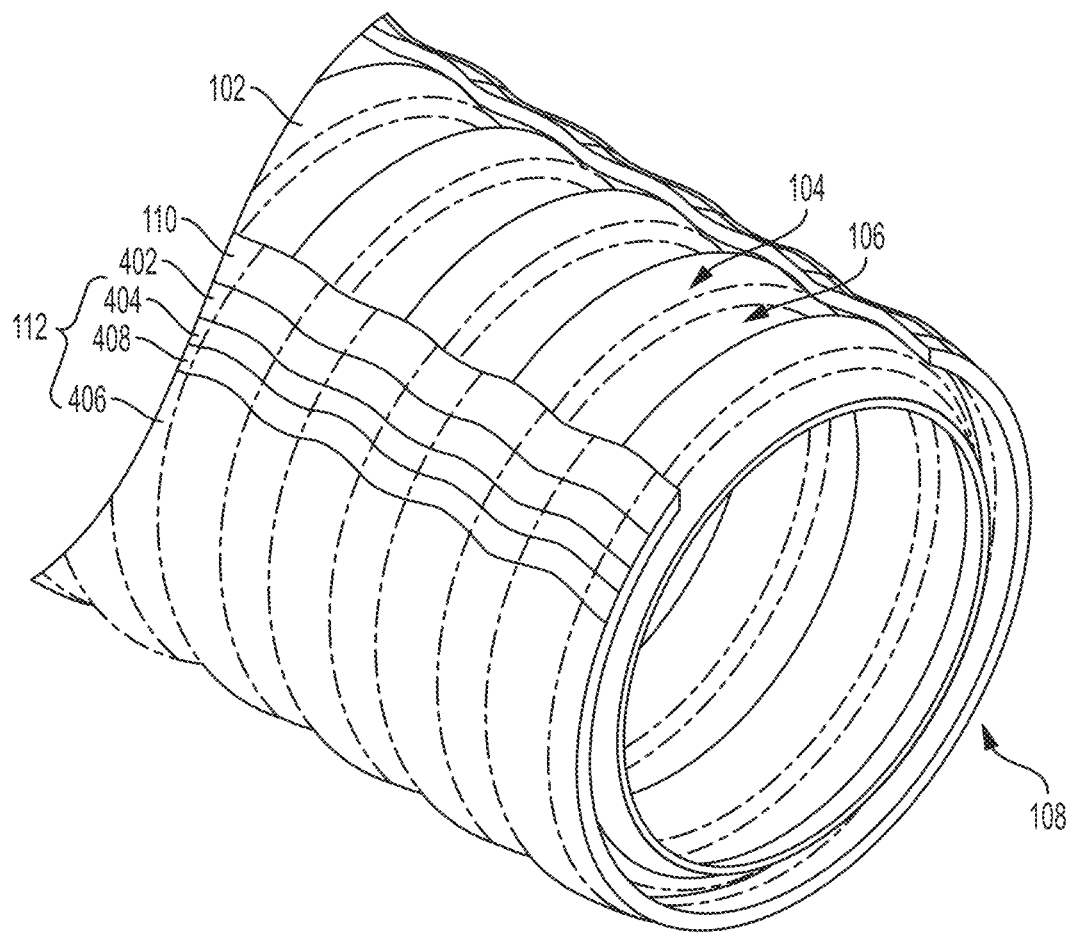
Figure 4C:
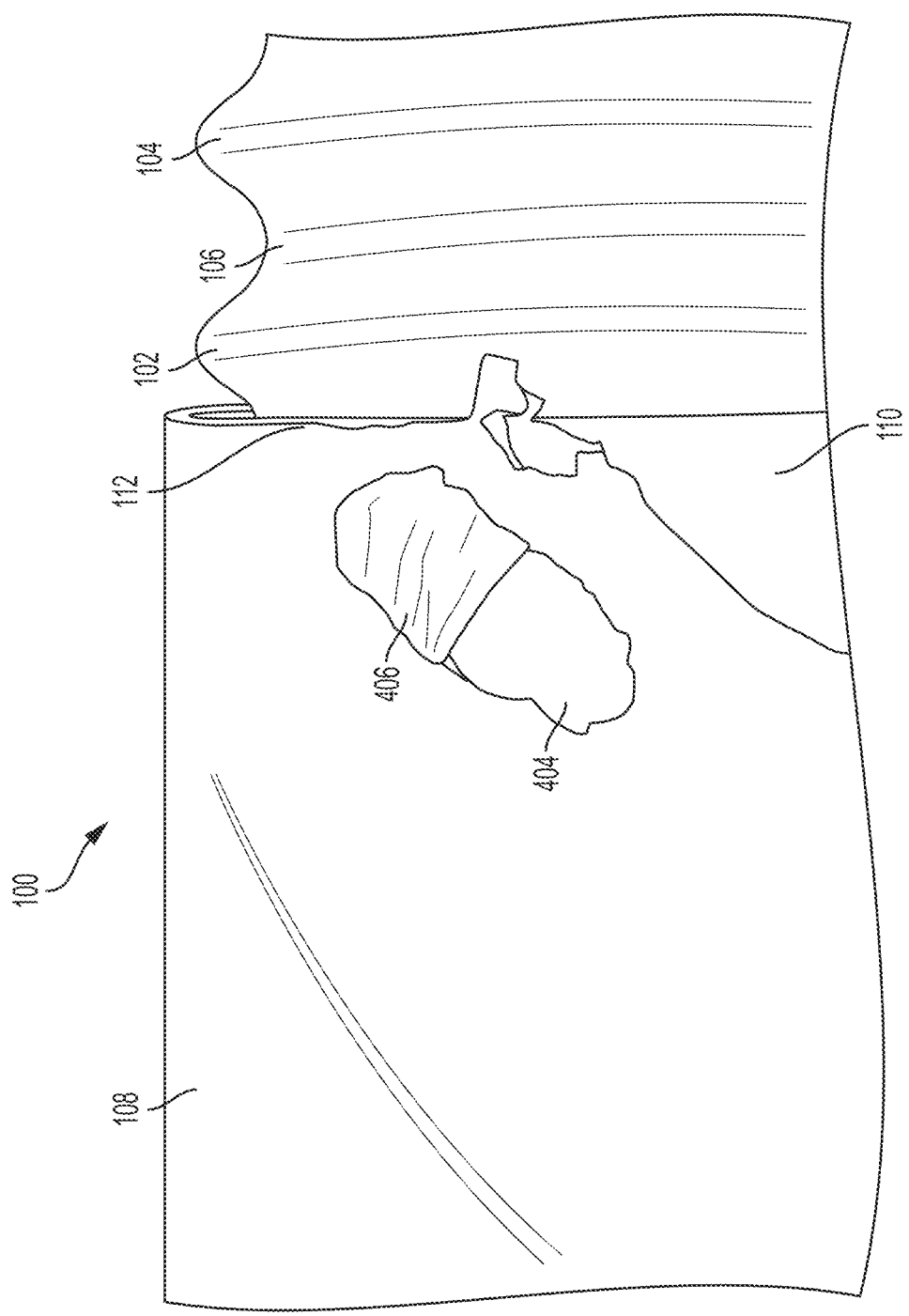
FIG. 4C depicts an energy-dissipative tube coated with a resin first jacket layer and a laminated foil second jacket layer according to an embodiment of the invention.

Referring now to FIGS. 4A-4C, another embodiment of the invention provides tubing including a laminated foil 412. For example, a second (e.g., outer) jacket layer 112 can be a laminated foil 412.

Laminated foils 412 can be previously laminated and applied as a single unit to the tubing 100, e.g., over inner jacket layer 110. In some embodiments, jacket layers 110, 412 are bound with an adhesive 402 (e.g., a conductive or non-conductive adhesive).

In one embodiment, the laminated foil 412 includes at least a metal foil layer 404 and a protective layer 406. The protective layer 406 can be a high-tensile-strength material that facilitates handling (e.g., during manufacturing or in the field) of relatively mechanically weak foils, thereby enabling of the use of metal foils 404 that are massive enough to absorb and dissipate electrical impulses from direct or induced lightning events, but thin enough to cause manufacturing and/or installation challenges.

As arranged over tubing 100, the metal foil layer 404 will preferably be located inside of the protective layer 406, but could be located external to the protective layer 406. The metal foil layer 404 and protective layer 406 can be laminated with an adhesive 408 (e.g., a conductive or non-conductive adhesive) or other techniques used in the laminate field.

Exemplary high-tensile-strength materials can have pre-lamination ultimate tensile strengths of about 3 pounds-force/inch of width (lb-f/inch) (e.g., at least about 0.5 N/mm of width), for example, between about 5 lb-f/inch and about 80 lb-f/inch (e.g., between about 0.8 N/mm of width and about 14 N/mm of width). Other exemplary pre-lamination ultimate tensile strengths include at least about 1, 2, 4, 5, 6, 7, 8, 9, 10, and 11 lb-f/inch of width and at least about 0.1, 0.2, 0.3, 0.4, 0.6, 0.7, 0.8, 0.9, 1, 2, 3, 4, 5, 6, 7, 8, 9, 10, 11, 12, 13 N/mm of width, as well as ranges between any of these values.

Similarly, metal foil layer 404 can, in some embodiments, have pre-lamination ultimate tensile strengths between about 8 lb-f/inch of width and about 60 or 140 lb-f/inch of width (e.g., between about 1 N/mm of width and about 10 or 25 N/mm of width). For example, metal foil layer 404 can have a pre-lamination ultimate tensile strength of less than about 1, 2, 3, 4, 5, 6, 7, 8, 9, 10, 11, or 12 lb-f/inch of width, 0.1, 0.2, 0.3, 0.4, 0.5, 0.6, 0.7, 0.8, 0.9, 1.0, 1.1, 1.2, 1.3, 1.4, 1.5, 1.6, 1.7, 1.8, 1.9, 2.0, 2.1, 2.2 N/mm of width, as well as ranges between any of these values.

The metal foil layer 404 can have a sufficient mass to absorb and distribute an arc to inner layers of tubing and/or along the metal foil layer 404. Without being bound by theory, Applicant believes that thicknesses of between about 0.0004" and about 0.004" (e.g., between about 0.01 mm and about 0.1 mm) are sufficient absorb and dissipate electrical impulses from direct or induced lightning events. The metal foil layer 404 can comprise one or more metals selected from the group consisting of aluminum, gold, silver, copper, nickel, tin, brass, steel, stainless steel, austenitic nickel-chromium-based superalloys, low carbon steel and phosphor bronze.

In one embodiment, the outer protective layer 406 includes a polymer, e.g., polyethylene terephthalate, polyester, polyamide, polyethylene, polypropylene, and the like. Outer protective layer 406 can protect the metal foil layer 404 from damage during manufacturing and/or installation (e.g., when pulled through chases or rough bores in joists, plates, and studs) and can also provide dielectric strength to guard against arcing. In certain embodiments, the outer protective layer 406 can have a thickness of about 0.0004" and about 0.01" (e.g., between about 0.01 mm and about 0.25 mm).

The laminated foil 412 can be applied to the tubing (e.g., to an inner resin layer 110) with an adhesive 402 (e.g., a conductive or non-conductive adhesive, a hot-melt adhesive, and the like), thermal fusion, self-adhesion, and the like. The laminated foil 412 can be wrapped helically or radially around the tubing 100.

First jacket layer 110 can be a conductive jacket layer. For example, the first jacket layer 110 can include a carbon-black-impregnated resin. In one embodiment, the first jacket layer 110 has a surface resistivity between about $10^3$ Ω-cm and about $10^6$ Ω-cm (e.g., between about $10^3$ Ω-cm and about $10^4$ Ω-cm, between about $10^4$ Ω-cm and about $10^5$ Ω-cm, between about $10^5$ Ω-cm and about $10^6$ Ω-cm, and the like). In one embodiment, the first jacket layer 110 includes a polymer, a thermoplastic polymer, and/or a thermoset polymer. In some embodiments, the first jacket layer 110 is extruded on the corrugated steel tubing 102.

Figure 4D:
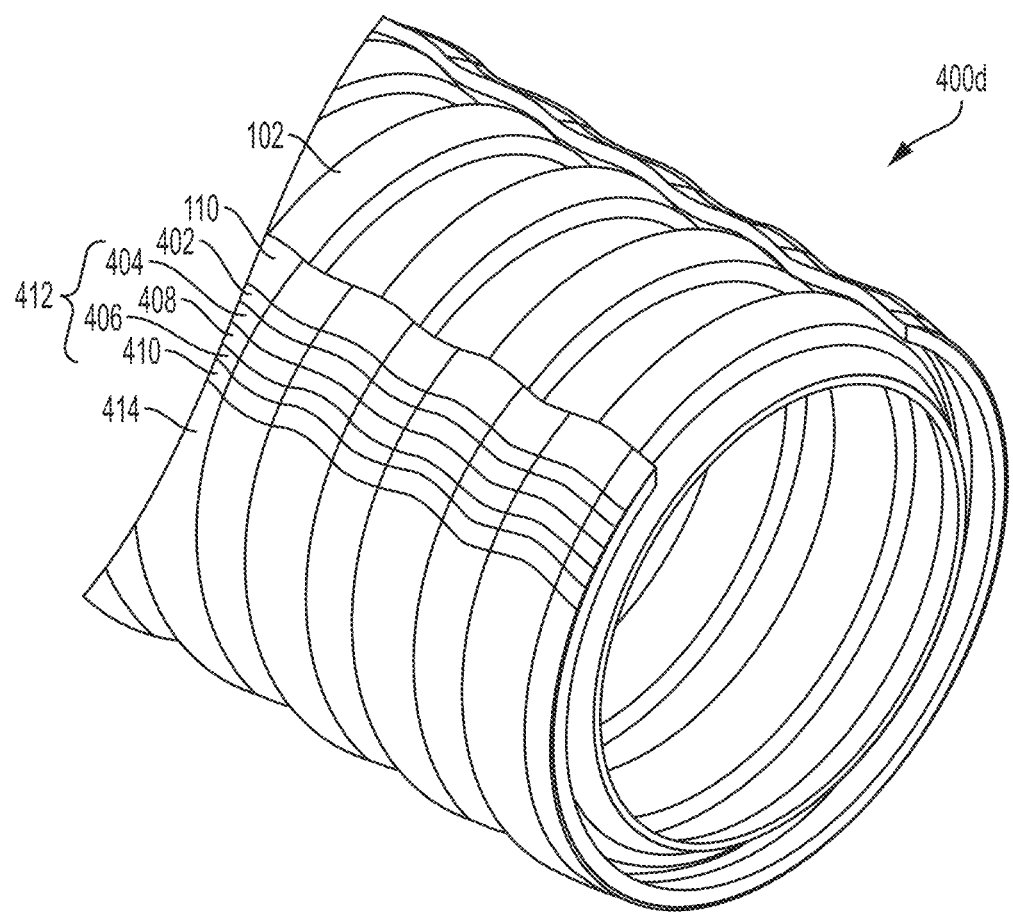
FIG. 4D is a perspective partial cutaway view of a multi-layer jacketed tube according to a further embodiment of the invention.

Referring now to FIG. 4D, another embodiment of the invention is depicted. Exemplary components are specified in Table 1 below.

TABLE 1

Exemplary Materials

| Element | | Sub-Element | |
|---|---|---|---|
| Reference | Description | Reference | Description |
| 102 | Corrugated tubing (e.g., CSST) | | |
| 110 | Conductive polymer | | |
| 402 | Adhesive (e.g., conductive adhesive, conductive ethylene acrylic acid) | | |
| 412 | Laminated foil | 404 | Aluminum foil |
| | | 408 | Adhesive (e.g., non-conductive adhesive, solvent-based adhesive, tie resin) |
| | | 406 | Polymer film (e.g., polyester, polyethylene terephthalate (PET)) |
| | | 410 | Adhesive (e.g., non-conductive adhesive, tie resin) |
| 414 | Polymer (e.g., non-conductive polymer, nylon) | | |

Embodiments of the invention can utilize a holt-melt adhesive 402 (e.g., ethylene acrylic acid) instead of pressure-sensitive adhesives, thereby avoiding the challenge of handling the removed liner typically covering pressure-sensitive adhesives prior to contact with a substrate. The hot-melt adhesive 402 can be applied over or with (e.g., by co-extrusion) polymer 110 and can optionally be cooled (e.g., below its melt temperature) before application of the laminated foil 412. The hot-melt adhesive 402 can be activated (e.g., after application of the laminated foil 412) by heating above the melt temperature specified for the hot-melt adhesive 402. The tubing 400*d* can be heated in sections or can be continuously drawn over or through one or more energy sources (e.g., heating elements, inductive heating elements, coherent light sources, incoherent light sources, heated fluid sources, resistive (Ohmic or Joule) heaters, microwave generators, ultrasound generators, and the like). For example, an inductive heating element can emit radio frequency (RF) energy that induces heating within the metal foil 404. The heat in the metal foil 404 is absorbed by adjacent layers, thereby melting adhesive layers 408 and/or 410.

The laminated foil 412 can be wrapped axially or helically as discussed herein.

Without being bound by theory, Applicant believes that the conductivity/resistivity of adhesives 408, 410 is not critical because the adhesive layers are relatively thin and easily overcome by an electrical current.

Extrusion of outer polymer layer 414 over the wrapped laminated foil 412 advantageously shields any exposed edges of metal foil 404, thereby increasing the dielectric strength of the resulting tubing (e.g., minimizing the likelihood of low-voltage arcing from adjacent electrical systems, protecting underlying layers from wear or unraveling, providing a smoother surface for pulling). In one embodiment, the outer polymer layer 414 has a thickness of several thousandths of an inch (e.g., between about 0.2 mm and about 2.5 mm), although thicker outer polymer layers 414 can be applied.

Tubing Having Engineered Dielectric Strengths

Embodiments of the tubing described herein can be engineered to have desired dielectric strength relative a layer over a conductive (e.g., metal) layer and/or the CSST 102. Such a dielectric strength (i.e., the minimum electric field necessary to overcome an outer insulative layer) can provide protection from lightning and/or induced lightning currents without attracting arcs from faulty electrical systems adjacent to the tubing. Tubing can be engineered to have a dielectric strength matched to anticipated installation environments (e.g., based on common line voltages within a given jurisdiction) and can be rated for certain dielectric strengths. For example, tubing can engineered to have a dielectric strength of at least about 110V, 120V, 127V, 220V, 230V, 240V, and the like. Without being bound by theory, Applicant believes that a relatively high ratio of volume resistivity of inner resin layer 110 to surface resistivity of the outer conductive layer 112, 404 may be advantageous by promoting linear dissipation of the charge along the surface of the outer conductive layer 112, 404 rather than radial dissipation through the inner resin layer 110. Exemplary ratios of volume resistivity of inner resin layer 110 (measured in Ω-cm) to surface resistivity of the outer conductive layer 112, 404 (measured in Ω/square) include: greater than about 0.1:1, greater than about 1:1, greater than about 10:1, greater than about 100:1, greater than about 1,000:1, between about 0.1:1 and about 1:1, between about 1:1 and about 10:1, between about 10:1 and about 100:1, between about 100:1 and about 1,000:1, and the like.

Additional Layer Features

In further embodiments of the invention, one or more layers of the jacket possess various properties such as flame resistance, heat resistance, sound insulation, temperature insulation, oil or water impermeability, and/or wear resistance. For example, a layer (e.g., the outermost layer) may incorporate a fire retardant. Suitable layers include polymers incorporating about 20% to 60% magnesium hydroxide, aluminum trihydrate, and/or halogenated fire retardants by weight.

In some embodiments, one or more of the resin layers have a 25/50 flame spread/smoke density index as measured in accordance with the ASTM E84 standard.

In order to better comply with installation requirements, some embodiments of resin layers are capable of elongation greater than or equal to about 200% as measured in accordance with the ASTM D638 standard. In other embodiments, the outer layer includes wear-resistant materials such as wire, cable, strands of material such as poly-aramid synthetic fiber such as KEVLAR® (available from E.I. Du Pont de Nemours and Company of Wilmington, Del.), and the like. Such materials may be incorporated within a polymer or resin layer or may be exposed.

Although embodiments of the invention having two or three layer jackets are depicted and discussed herein, the invention is not limited to jackets having particular number of layers. Rather, additional embodiments in which a jacket includes more than three layers are contemplated according to the principles, patterns, and spirit of the specific embodiments described herein.

Method of Fabricating Energy-Dissipative Tubing

Figure 5:
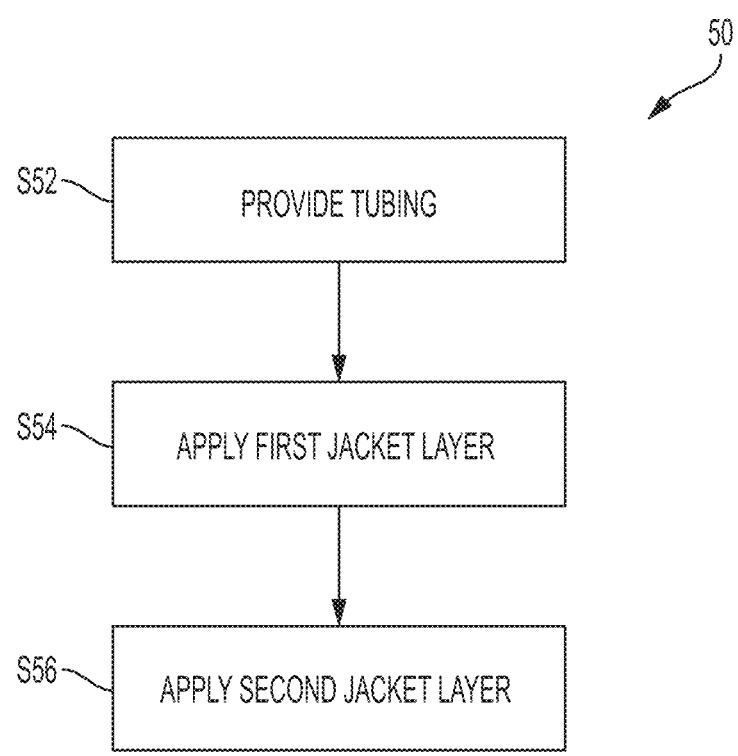
FIG. 5 depicts a method of fabricating an energy-dissipative tube according to an embodiment of the invention.

Energy-dissipative tubing of the invention can be fabricated in accordance with existing techniques for the manufacture of CSST. An exemplary method 50 for fabricating energy-dissipative tubing is depicted in FIG. 5.

In step S52, a length of corrugated tubing is provided. The corrugated tubing can be metal tubing, thin-walled metal tubing, corrugated stainless steel tubing, and the like. Embodiments of suitable tubing are described elsewhere herein.

In step S54, a first jacket layer 110 is applied to the exterior of the tubing. The first jacket layer 110 can be a resin layer applied to the tubing by extrusion.

In step S56, a second jacket layer 112 is applied to the exterior of the tubing and the first jacket layer 110. The second jacket layer 112 can be applied to the exterior of the tubing by a variety of techniques. The second jacket layer 112 can be a resin layer applied to the tubing by extrusion. The second jacket layer 112 can be a foil, laminated foil, tape or wire layer or the like and can be wound onto the tubing. A foil, laminated foil, tape or wire can be wrapped around the first jacket layer 110 through a number of methods, including helically and radially wrapping.

In some embodiments, an adhesive (e.g., a conductive adhesive, a non-conductive adhesive) is used to secure the first jacket layer 110 to the corrugated tube 102. In some embodiments, an adhesive (e.g., a conductive or non-conductive adhesive) is used to secure the second jacket layer 112 to the first jacket layer 110.

In certain embodiments in which the first jacket layer 110 and the second jacket layer 112 are both resin layers, steps S54 and S56 can be carried out simultaneously through co-extrusion.

Sealing Devices for Energy-Dissipative Tubing

The invention further provides a sealing device for use with the energy-dissipative tubing, comprising an arc-trapping bushing configured and designed to attract and redirect an arc from the first jacket layer 110 and/or the second jacket layer 112.

Figure 6:
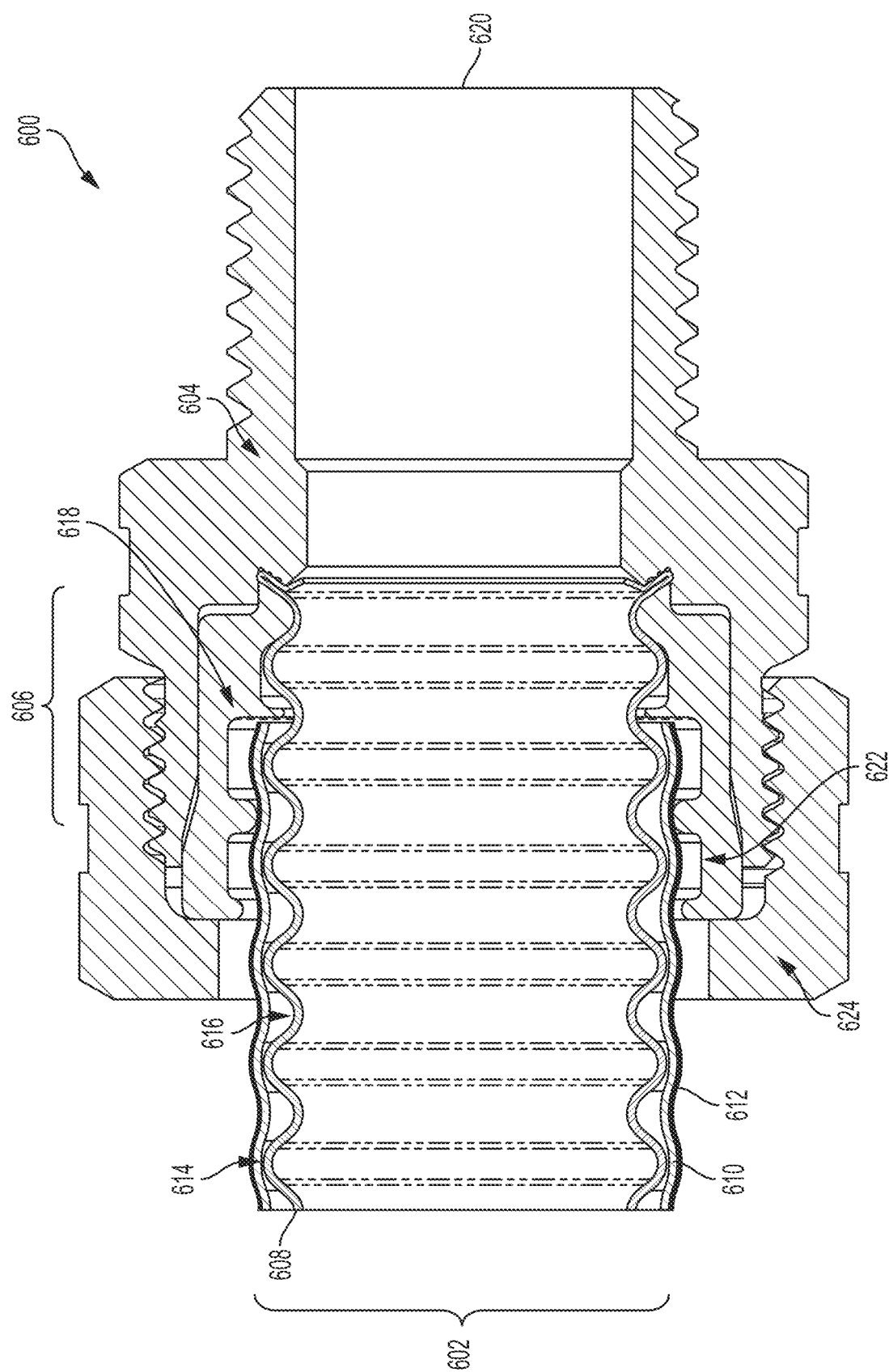
FIG. 6 depicts a sealing device including an arc-trapping bushing according to an embodiment of the invention.
Figure 7A:
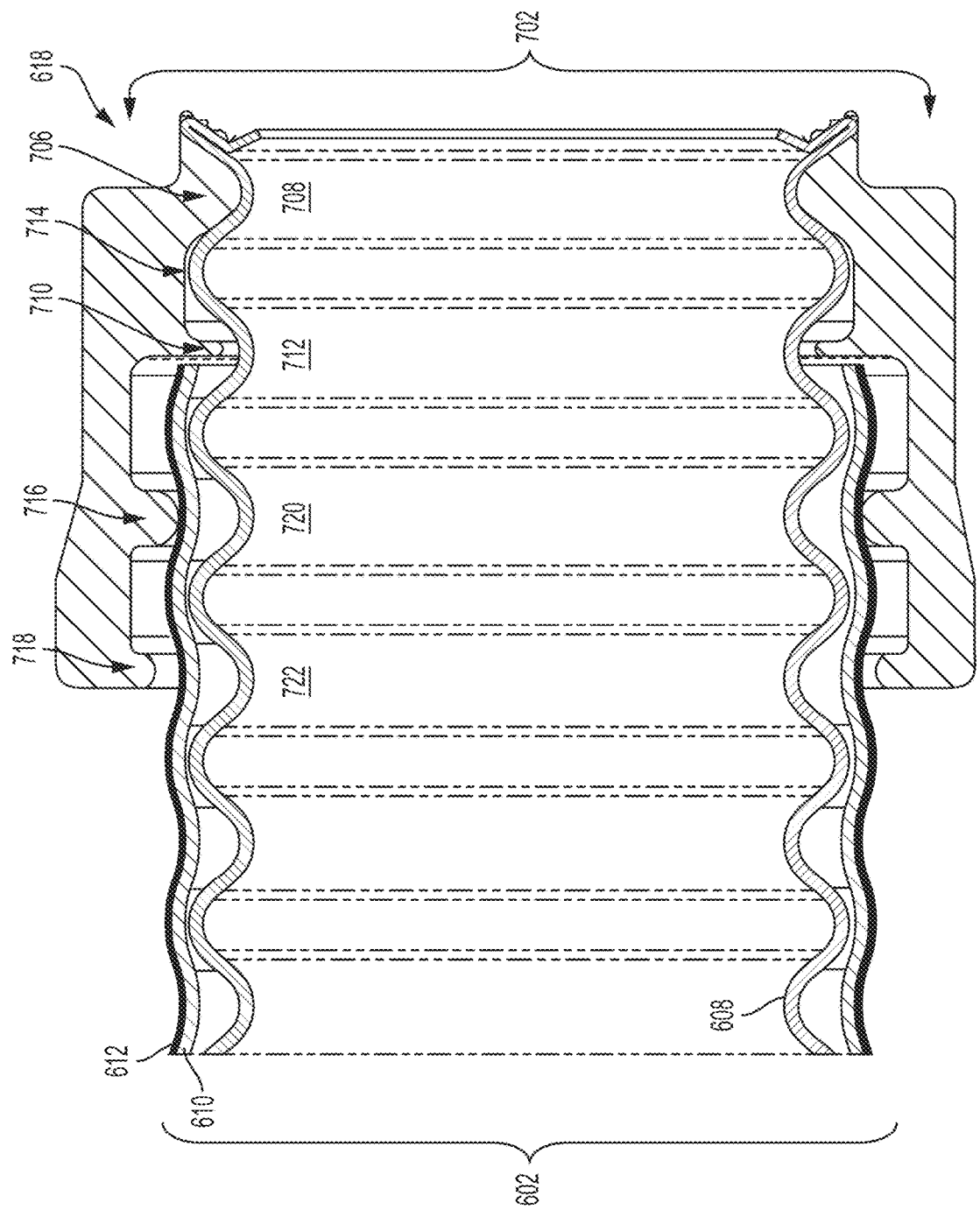
Figure 7D:
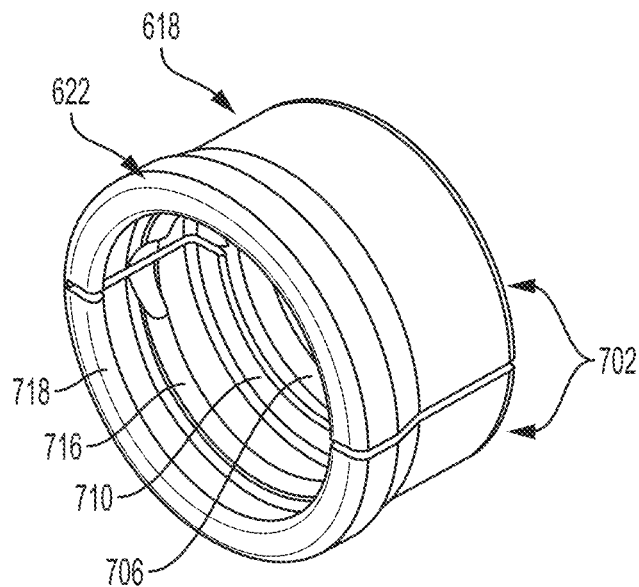
Figure 7E:
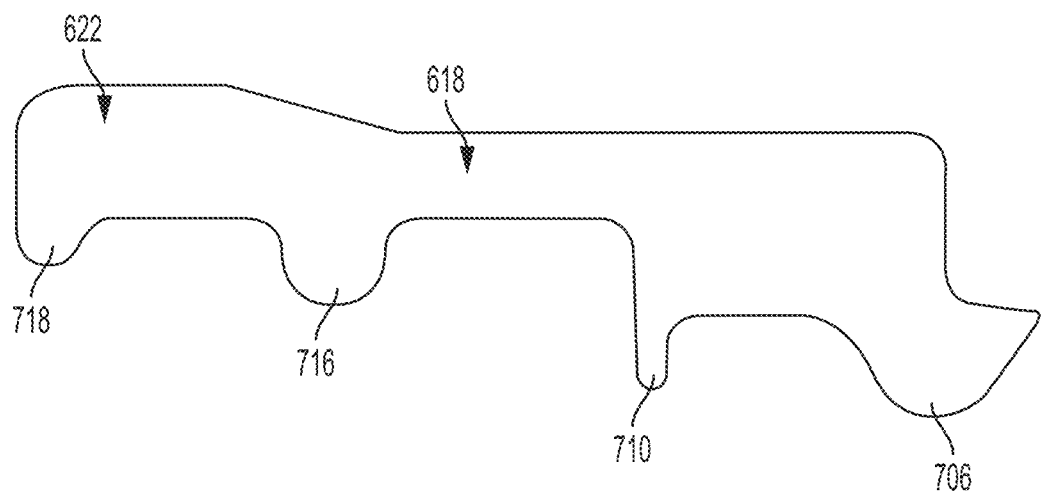
Figure 7F:
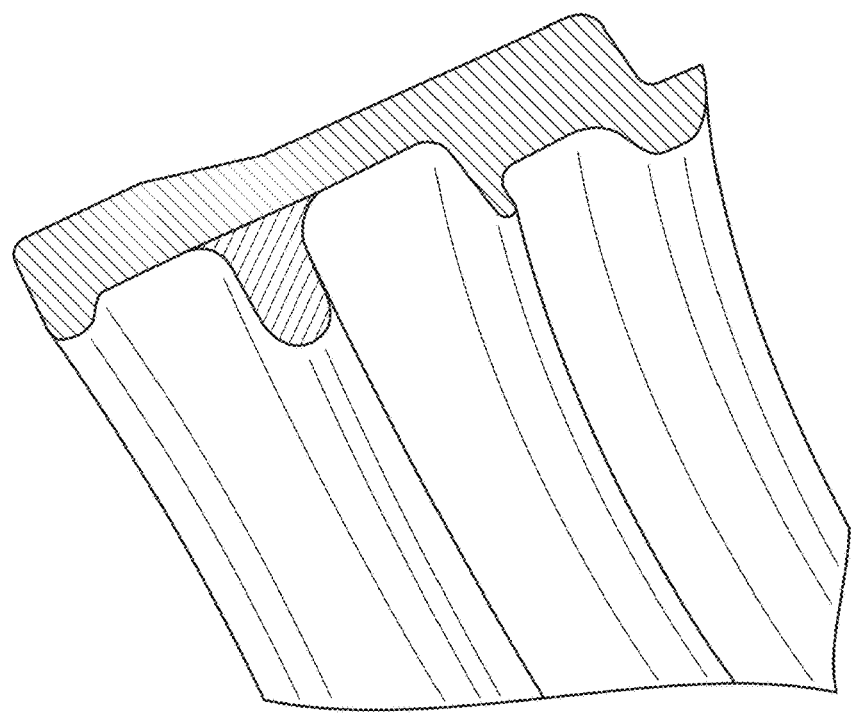
Figure 7G:
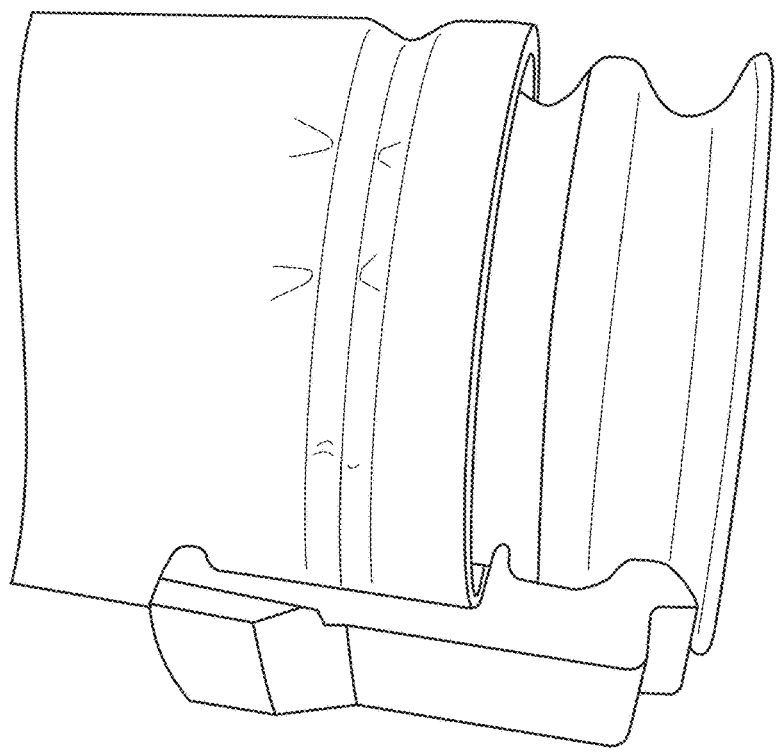

Referring now to FIG. 6, a sealing device 600 is provided for energy-dissipative tubing 602. The sealing device 600 can include a body (or adapter) 604 including a sleeve portion 606.

The energy-dissipative tubing 602 can be any tubing configured to dissipate electrical energy. Various examples of energy-dissipative tubing 602 are described herein. In one example depicted in FIG. 6, the energy-dissipative tubing 602 includes a length of corrugated tubing 608 (e.g., corrugated stainless steel tubing), a first jacket layer 610 adjacent to the tubing 608, and a second jacket layer 612 adjacent to the first jacket layer 610. Other exemplary energy-dissipative tubing 602 is described in U.S. Pat. Nos. 8,905,083, 9,249,904 and 9,445,486 and includes CSST sold currently sold under the FLASHSHIELD® brand by Titeflex Corporation of Portland, Tenn. and COUNTERSTRIKE® brand by OmegaFlex, Inc. of Exton, Pa. The length of corrugated tubing 608 can include a number of corrugation peaks 614 and corrugation valleys 616, which have a substantially uniform geometry and spacing.

The sealing device 600 includes an arc-trapping bushing 618. Referring now to FIGS. 7A-7G, the arc-trapping bushing 618 can surround the energy-dissipative tubing 602 which has been stripped at a corrugation valley 616, removing a portion of the first jacket layer 610 and the second jacket layer 612, exposing two or more corrugation valleys 708, 712. The arc-trapping bushing 618 can include one or more components 702 (e.g., two 180° sectors). The bushing components 702 can include two or more internal ribs 706, 710 that engage two or more stripped corrugation valleys 708, 712. In certain embodiments, the arc-trapping bushing 618 has a first internal rib 706 that engages with a final corrugation valley 708 of the corrugated tubing 608. In certain embodiments, the arc-trapping bushing 618 has a second internal rib 710 that rests within a further corrugation valley 712 of the corrugated tubing 608. The second internal rib 710 can rest within the further corrugation valley 712, substantially between the second jacket layer 612 and the adjacent exposed corrugation peak 714. The second internal rib 710 can rest within the further corrugation valley 712 without making contact with the further corrugation valley. In certain embodiments, the second internal rib 710 is substantially perpendicular to the central axis of the arc-trapping bushing 618. The second internal rib 710 can be adapted and configured to intercept an arc from the first jacket layer 610 and/or the second jacket layer 612. The arc-trapping bushing 618 can further comprise one or more additional internal ribs 716, 718 that engage one or more jacketed corrugation valleys 720, 722. In certain embodiments, the final corrugation valley 708 and the further corrugation valley 712 are adjacent to one another. In other embodiments, the final corrugation valley 708 and the further corrugation valley 712 are separated by one or more corrugation valleys.

Figure 9:
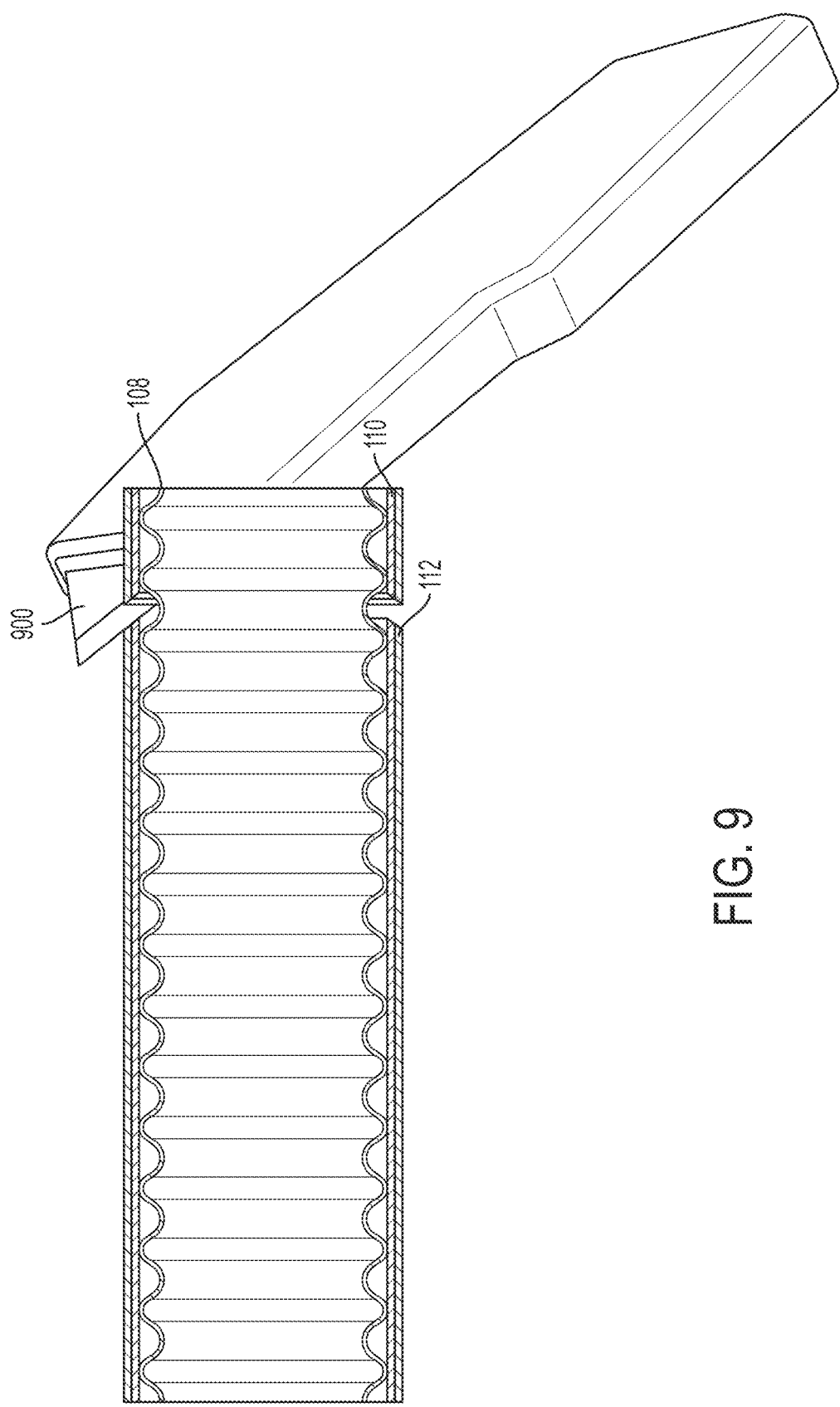
FIG. 9 depicts a cutting implement removing a portion of the first jacket layer and second jacket layer from a tube according to an embodiment of the invention.

Without being bound by theory, Applicant believes that electrical impulses dissipated by jacket layers 610, 612 have a directionality and will exit from the end of jacket layers 610, 612 in a substantially axially direction. Embodiments of this invention leverage this directionality to avoid any need for direct contact between the bushing and jacket layers 610, 612, thereby relaxing tolerances for both the bushing, sealing device, and jacket. For example, jacket layers 610, 612 can be cut back to any position between a corrugation peak or valley and the second internal rib 710. Such a cut can be easily achieved using jacket-stripping tool as described in U.S. Patent Application Publication No. 2014/0373695 or a utility knife by angling the knife blade back and away from the cut end of the CSST as depicted in FIG. 9.

Referring again to FIG. 6, the arc-trapping bushing 618 and the sleeve portion 606 can be configured to compress the arc-trapping bushing 618 as the arc-trapping bushing 618 is advanced towards a proximal end 620 of the sealing device 600. For example, the arc-trapping bushing 618 can include an enlarged diameter region 622 configured to interact with a tapered interior of sleeve portion 606 to provide substantially uniform compression of arc-trapping bushing 618 as the arc-trapping bushing is advanced proximally.

The arc-trapping bushing 618 can be advanced proximally through a variety of techniques and components. For example, the split bushing 618 can be engaged by a tool and advanced proximally until the arc-trapping bushing 618 is held within the sleeve portion 606 by friction, locking members, and/or retention members as described in U.S. Patent Application Publication No. 2010/0181760. In another embodiment, as depicted in FIG. 6, an exterior of the sleeve portion 606 can be threaded in order to mate with a nut 624. As the nut 624 is tightened, the arc-trapping bushing 618 is advanced proximally to compress the arc-trapping bushing 618 and create a gas-tight seal between the corrugated tubing 608 and the body 604.

Sealing device 600 and/or bushing 618 can include a sealing face having one or more sealing circular ridges adapted and configured to facilitate a metal-to-metal gastight seal. Such a sealing architecture is described in U.S. Pat. Nos. 7,607,700 and 7,621,567 and embodied in the XR3 fitting available from Titeflex Corporation of Portland, Tenn.

The sealing device 600, arc-trapping bushing 618, and/or nut 624 can be fabricated from materials such as metals (e.g., iron, copper, aluminum, gold, silver, and the like), metal alloys (e.g., brass, bronze, steel, and the like), plastics, polymers, elastomers, and the like. Preferably the sealing device 600, arc-trapping bushing 618, and/or nut 624 are fabricated from conductive materials in order to provide a conductive path between the energy-dissipative tubing 602 to a grounding conductor (e.g., a fitting, a pipe, an appliance, a grounding wire, and the like).

The sealing devices described herein can be attached in the field or in a factory.

Methods of Installing Energy-Dissipative Tubing

Figure 8:
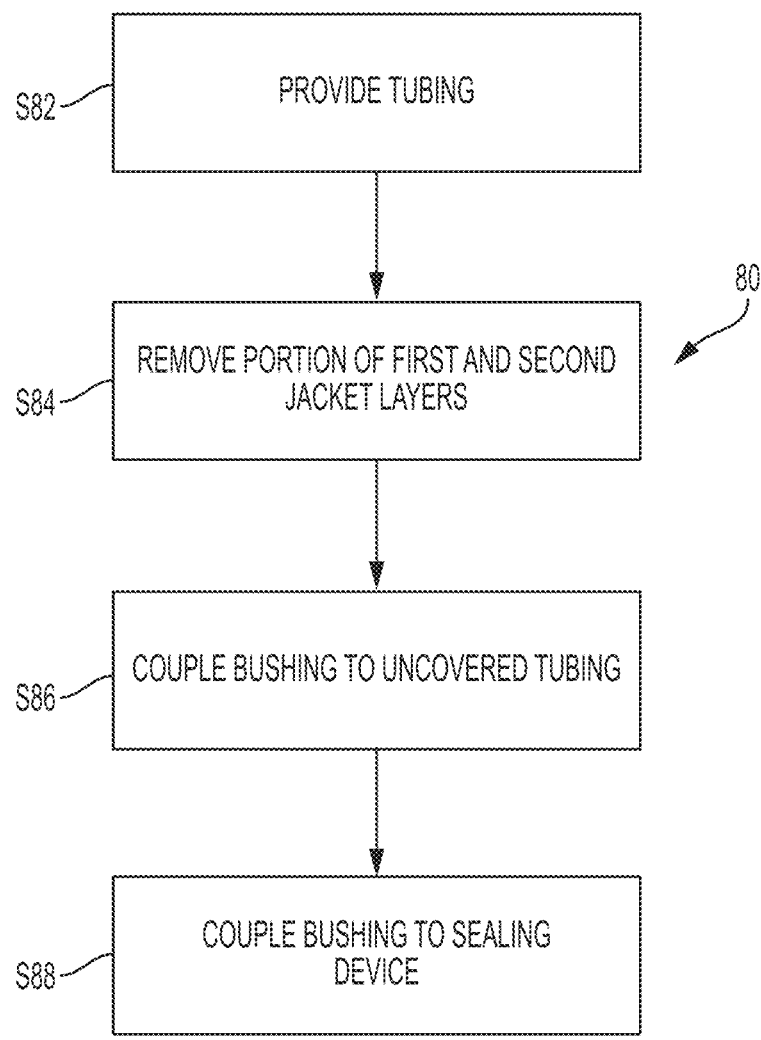
FIG. 8 depicts a method of installing energy-dissipative tubing according to an embodiment of the invention.

Referring now to FIG. 8, a method 800 of installing energy-dissipative tubing is provided.

In step S82, a length of corrugated energy-dissipative tubing is provided. The corrugated energy-dissipative tubing can be the same or similar to the energy-dissipative tubing described herein. For example, the corrugated energy-dissipative tubing can include a length of tubing (e.g., corrugated stainless steel tubing), a first jacket layer adjacent to the tubing, and a second jacket layer adjacent to the first jacket layer. In one embodiment, the first jacket layer is a conductive resin and the second jacket layer is either a conductive-particle-containing resin or a laminated foil.

In step S84, a portion of the first jacket layer and the second jacket layer can be removed from an end of the energy-dissipative tubing to expose two or more corrugation valleys, including a final corrugation valley and a further uncovered corrugation valley. In certain embodiments, additional corrugation valleys may be uncovered between the final corrugation valley and the further uncovered corrugation valley. In certain embodiments, the first jacket layer and the second jacket layer can be removed with a cutting tool (e.g., with a utility knife, a razor blade, a tube cutter, and the like). In other embodiments, the cutting tool is a jacket-stripping tool comprising one or more cutting blades arranged substantially perpendicular to a central axis of the tool and adapted and configured to create one or more cuts through the first jacket layer and the second jacket layer of the energy-dissipative tubing over the further uncovered corrugation valley.

In step S86, an arc-trapping bushing is placed over the uncovered section of the energy-dissipative tubing, such that a first internal rib of the arc-trapping bushing engages the final corrugation valley of the energy-dissipative tubing and a second internal rib of the arc-trapping bushing rests within the further uncovered corrugation valley of the energy-dissipative tubing, lying substantially between the first jacket layer and/or second jacket layer and a proximal corrugation peak.

In step S88, the assembled energy-dissipative tubing coupled to the arc-trapping bushing can be coupled with a sealing device comprising a sleeve portion. The arc-trapping bushing can then be compressed as it is proximally advanced within the sleeve portion as discussed herein. As discussed elsewhere herein, the arc-trapping bushing can be advanced through the use of a tool or by tightening a nut to create a gas-tight seal.

Referring now to FIG. 9, step S84 can be carried out through the use of a cutting tool 900, wherein the first and second jacket layers 110/112 are removed from the corrugated steel tube 108 such that two or more corrugation valleys are exposed.

Kits and Systems

The invention further provides kits and systems comprising the elements disclosed elsewhere herein.

In one embodiment, the invention provides a kit, the kit comprising a length of energy-dissipative tubing as described elsewhere herein, a sealing device comprising a bushing as described elsewhere herein and instructions for methods of installing the energy-dissipative tubing using the sealing device and bushing. In certain embodiments, the kit can further comprise a cutting tool for removing the first jacket layer and the second jacket layer as described in the methods herein.

In another embodiment, the invention provides a system comprising a length of energy-dissipative tubing as described elsewhere herein and a sealing device comprising a bushing as described elsewhere herein.

Distribution of Arcing

Without being bound by theory, Applicant believes that embodiments of the invention (e.g., tubing and/or fittings, assembled with each other or in combination with conventional CSST tubing or fittings) are optimized to effectively utilize both the tubing and the fittings to effectively distribute electrical energy while remaining cost-efficient. Applicant believes that such distribution will be evidenced by arcing at least two or three locations when exposed to fault currents and lightning strikes. A first arc will occur at the point of entry (e.g., the location adjacent to energized conductor (e.g., metal duct work, faulty wiring, metal studs, strike plates). One or two additional arcs will occur at one or both fittings. These latter arcs may be contained within the fitting as discussed herein, but may be evidenced by discoloration upon disassembly of the fitting.

EQUIVALENTS

Although preferred embodiments of the invention have been described using specific terms, such description is for illustrative purposes only, and it is to be understood that changes and variations may be made without departing from the spirit or scope of the following claims.

INCORPORATION BY REFERENCE

The entire contents of all patents, published patent applications, and other references cited herein are hereby expressly incorporated herein in their entireties by reference.

The invention claimed is:

1. A system comprising:
an energy-dissipative fuel gas tube comprising:
a length of corrugated stainless steel tubing;
an inner resin layer surrounding a radially outer surface of the corrugated stainless steel tubing;
a laminated foil layer surrounding a radially outer surface of the inner resin layer, the laminated foil layer comprising:
  a foil having a thickness between about 0.0004" and about 0.004"; and
  a high-tensile-strength material bonded to the foil; and
an outer resin layer extruded over a radially outer surface of the laminated foil layer;
a first sealing device coupled to a first end of the length of energy-dissipative fuel gas tube; and
a second sealing device coupled to a second end of the length of energy-dissipative fuel gas tube;
wherein exposure to one or more selected from the group consisting of: fault currents or lightning strikes at an exposure point along the length of energy-dissipative tubing will produce arcs at:
  the exposure point; and
  at least one of the first end and the second end.

2. The energy-dissipative fuel gas tube of claim 1, wherein the high-tensile-strength material has a pre-lamination ultimate tensile strength of at least about 3 lb-f/inch of width.

3. The energy-dissipative fuel gas tube of claim 1, wherein the high-tensile-strength material has a pre-lamination ultimate tensile strength of between about 5 lb-f/inch of width and about 80 lb-f/inch of width.

4. The energy-dissipative fuel gas tube of claim 1, wherein the foil has a pre-lamination ultimate tensile strength of less than about 12 lb-f/inch of width.

5. The energy-dissipative fuel gas tube of claim 1, wherein the laminated foil layer has an ultimate tensile strength of at least about 8 lb-f/inch of width.

6. The energy-dissipative fuel gas tube of claim 1, the laminated foil layer has an ultimate tensile strength of between about 8 lb-f/inch of width and about 140 lb-f/inch of width.

7. The energy-dissipative fuel gas tube of claim 1, wherein the high-tensile-strength material is a polymer.

8. The energy-dissipative fuel gas tube of claim 1, wherein the high-tensile-strength material is a polyester.

9. The energy-dissipative fuel gas tube of claim 1, wherein the high-tensile-strength material is polyethylene terephthalate (PET).

10. The energy-dissipative tube of claim 1, wherein the outer resin layer provides a minimum dielectric strength of 110 volts to one or more underlying layers selected from the group consisting of: the foil, the inner resin layer, and the corrugated stainless steel tubing.

11. The energy-dissipative tube of claim 1, wherein the outer resin layer completely surrounds the laminated foil layer.

12. The energy-dissipative tube of claim 1, wherein the outer resin layer comprises a non-conductive polymer.

13. The energy-dissipative tube of claim 1, wherein the outer resin layer comprises nylon.

14. The energy-dissipative tube of claim 1, wherein the laminated foil layer is bound to the inner resin layer by a hot-melt adhesive.

15. The energy-dissipative tube of claim 14, wherein the hot-melt adhesive is ethylene acrylic acid.

16. The energy-dissipative tube of claim 1, wherein the first sealing device and the second sealing device each comprise a bushing comprising:
a first internal rib engaged with a final corrugation valley of the corrugated tubing; and
a second internal rib resting within a further uncovered corrugation valley of the corrugated tubing and lying substantially between the conductive layer of the energy-dissipative tubing and a proximal corrugation peak of the energy-dissipative tubing.

17. A system comprising:
an energy-dissipative fuel gas tube comprising:
a length of corrugated stainless steel tubing;
a resin layer surrounding a radially outer surface of the corrugated stainless steel tubing; and
a laminated foil layer surrounding and bound directly to a radially outer surface of the resin layer, the laminated foil layer comprising:
  a foil having a thickness between about 0.0004" and about 0.004"; and
  an outer protective layer bonded to the foil;
a first sealing device coupled to a first end of the length of energy-dissipative fuel gas tube; and
a second sealing device coupled to a second end of the length of energy-dissipative fuel gas tube;
wherein exposure to one or more selected from the group consisting of: fault currents or lightning strikes at an exposure point along the length of energy-dissipative tubing will produce arcs at:
  the exposure point and
  at least one of the first end and the second end.

18. The energy-dissipative tube of claim 17, wherein the first sealing device and the second sealing device each comprise a bushing comprising:
a first internal rib engaged with a final corrugation valley of the corrugated tubing; and
a second internal rib resting within a further uncovered corrugation valley of the corrugated tubing and lying substantially between the conductive layer of the energy-dissipative tubing and a proximal corrugation peak of the energy-dissipative tubing.

* * * * *